(12) United States Patent
Kean et al.

(10) Patent No.: US 7,782,409 B2
(45) Date of Patent: Aug. 24, 2010

(54) MULTIPLE VIEW DISPLAY

(75) Inventors: Diana U. Kean, Oxfordshire (GB); David James Montgomery, Oxfordshire (GB); Grant Bourhill, Stow-on-the-Wold (GB); Jonathan Mather, Cheltenham (GB)

(73) Assignee: Sharp Kabushiki Kaisha, Osaka (JP)

( * ) Notice: Subject to any disclaimer, the term of this patent is extended or adjusted under 35 U.S.C. 154(b) by 451 days.

(21) Appl. No.: 10/729,714

(22) Filed: Dec. 5, 2003

(65) Prior Publication Data
US 2004/0119896 A1    Jun. 24, 2004

(30) Foreign Application Priority Data
Dec. 7, 2002   (GB) ................................. 0228644.1

(51) Int. Cl.
   *G02F 1/1335*   (2006.01)
   *G02F 1/135*    (2006.01)
(52) U.S. Cl. ......................................... 349/15; 349/25
(58) Field of Classification Search .................. 349/15, 349/25, 30
See application file for complete search history.

(56) References Cited

U.S. PATENT DOCUMENTS

| 6,128,132 | A | 10/2000 | Wieland et al. |
| 6,195,205 | B1 | 2/2001 | Faris |
| 6,320,567 | B1 | 11/2001 | Hirakata et al. |
| 6,753,990 | B1 * | 6/2004 | Payne et al. ................... 359/22 |
| 2003/0067460 | A1 | 4/2003 | Tomono |

FOREIGN PATENT DOCUMENTS

| EP | 1 248 473 A1 | 10/2002 |
| JP | 07-028015 | 1/1995 |
| JP | 08-292410 | 11/1996 |
| JP | 08-331605 | 12/1996 |
| JP | 09-281440 | 10/1997 |
| JP | 10-074267 | 3/1998 |
| JP | 10-078563 | 3/1998 |
| WO | 03/007053 A2 | 1/2003 |

OTHER PUBLICATIONS

Office Action in corresponding Japanese Application No. 2003-406540 dated Jun. 20, 2008.
European Search Report for Application No. 03104567.7-2202 dated Jul. 6, 2006.

\* cited by examiner

*Primary Examiner*—Dung T. Nguyen
(74) *Attorney, Agent, or Firm*—Renner, Otto, Boisselle & Sklar, LLP

(57) ABSTRACT

A multiple view display comprises a display device such as a liquid crystal device, a parallax optic such as a parallax barrier, and a controller. The device comprises rows and columns of pixels and the controller supplies image data for a first view to first ones of the pixels and second ones of the pixels such that the first and second pixels alternate in the rows and in the columns. The parallax optic comprises rows and columns of parallax elements with the arrangement of pixels and parallax elements being such that each element co-operates with a respective pair of first and second pixels adjacent each other in the same row to form first and second viewing regions. Each row of parallax elements is off-set in the row direction by half the horizontal barrier pitch. Such an arrangement allows wider angles between the viewing regions to be achieved.

8 Claims, 13 Drawing Sheets

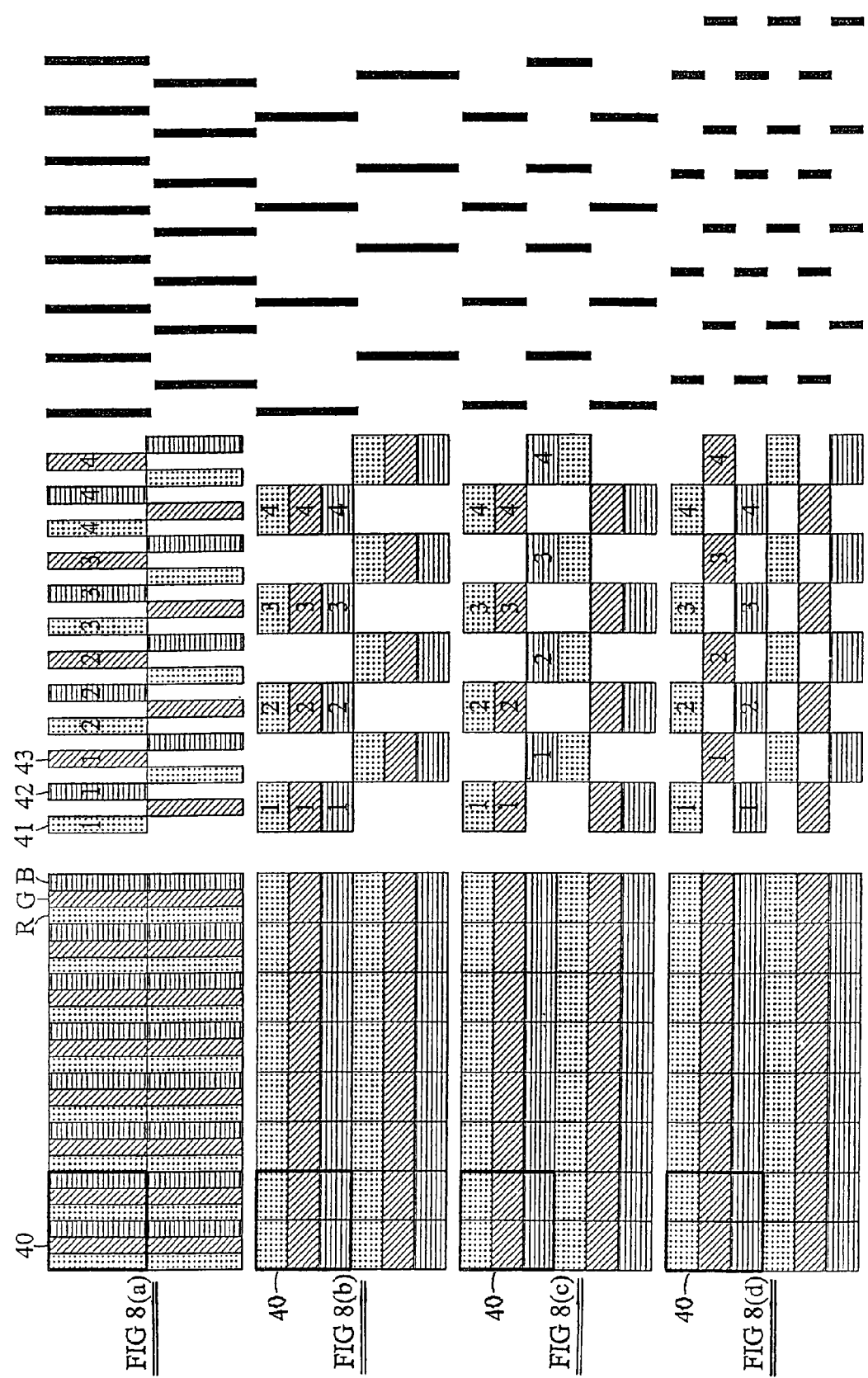

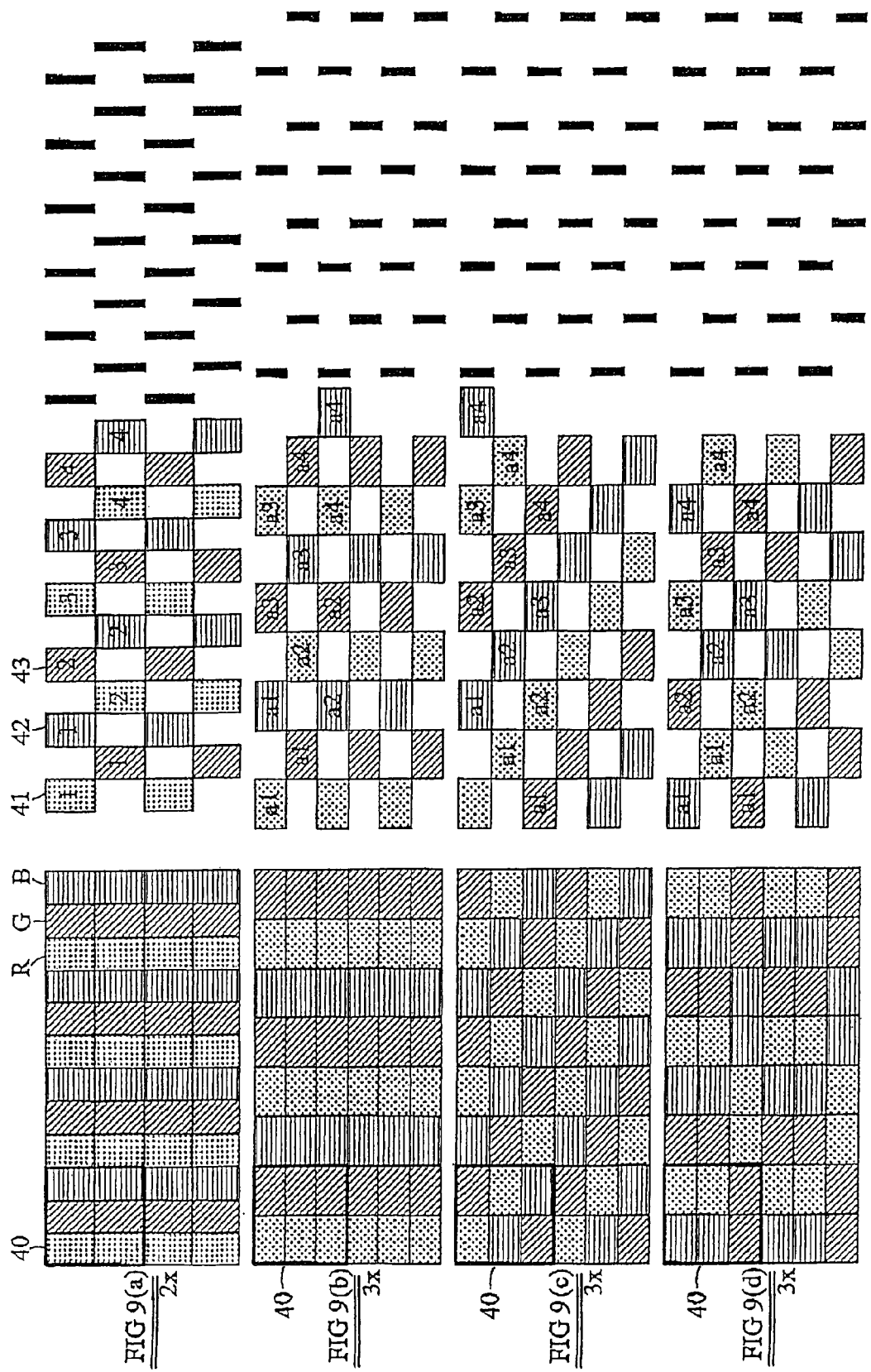

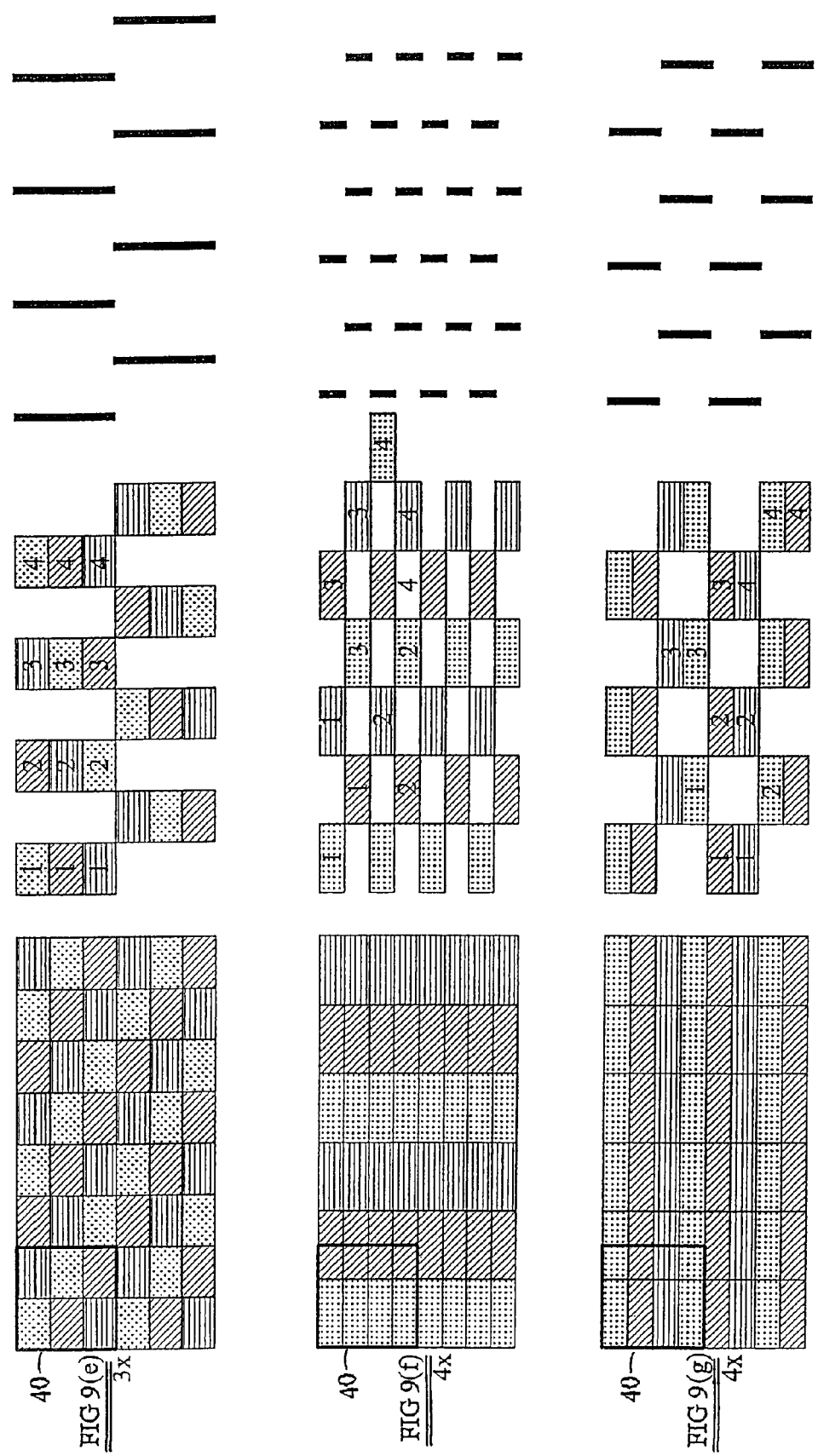

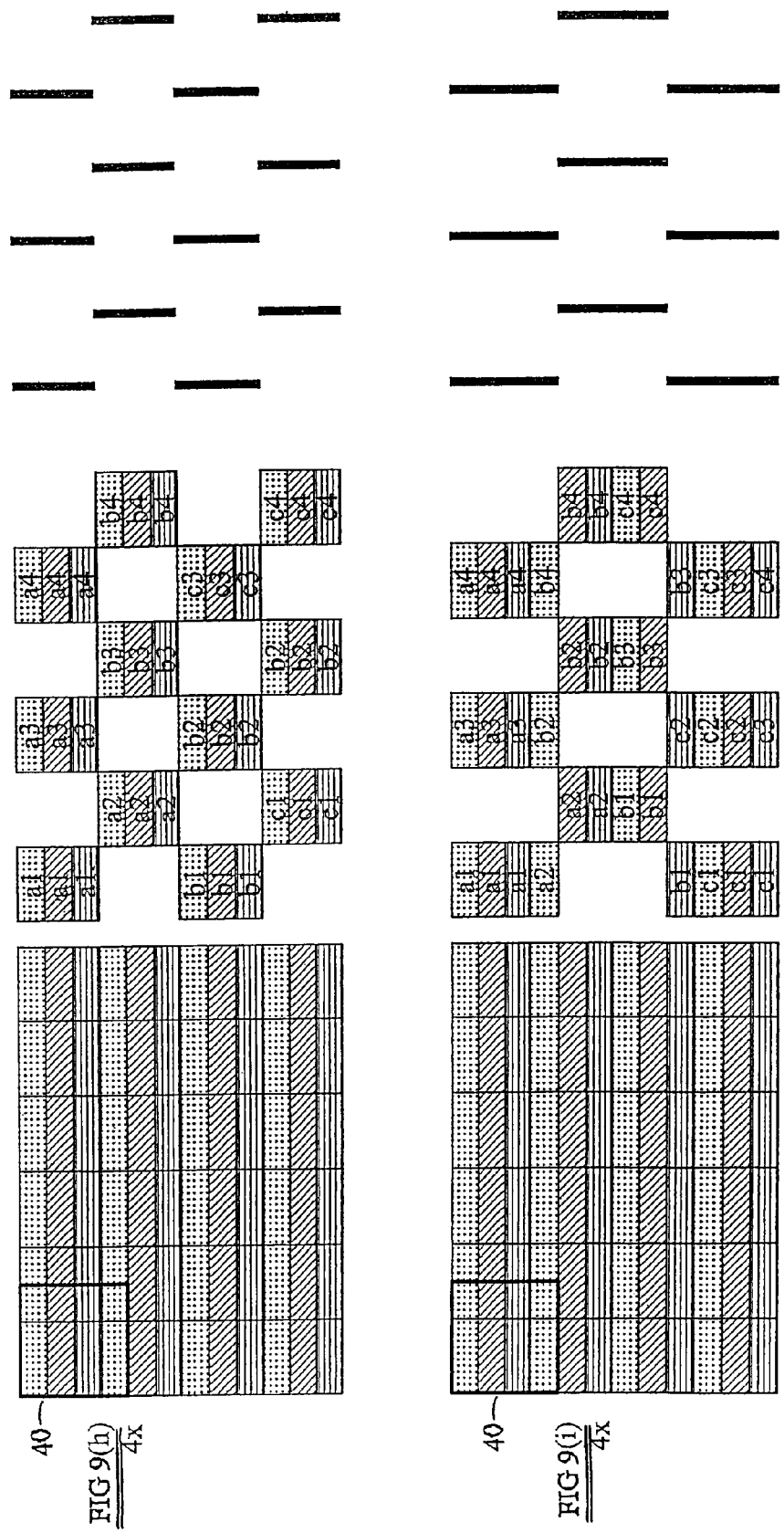

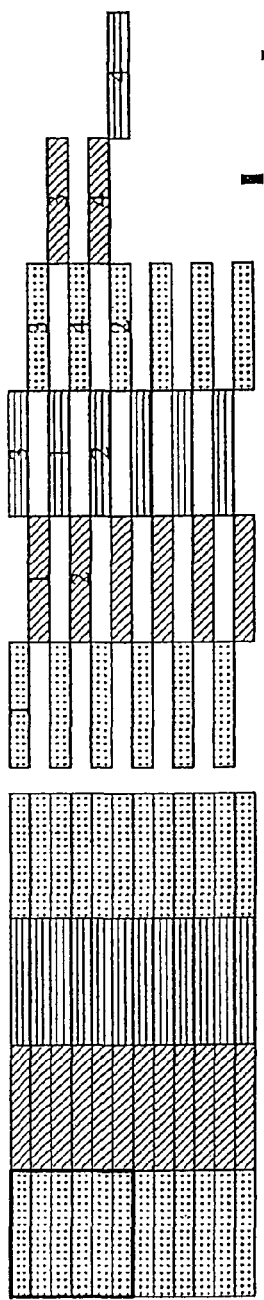
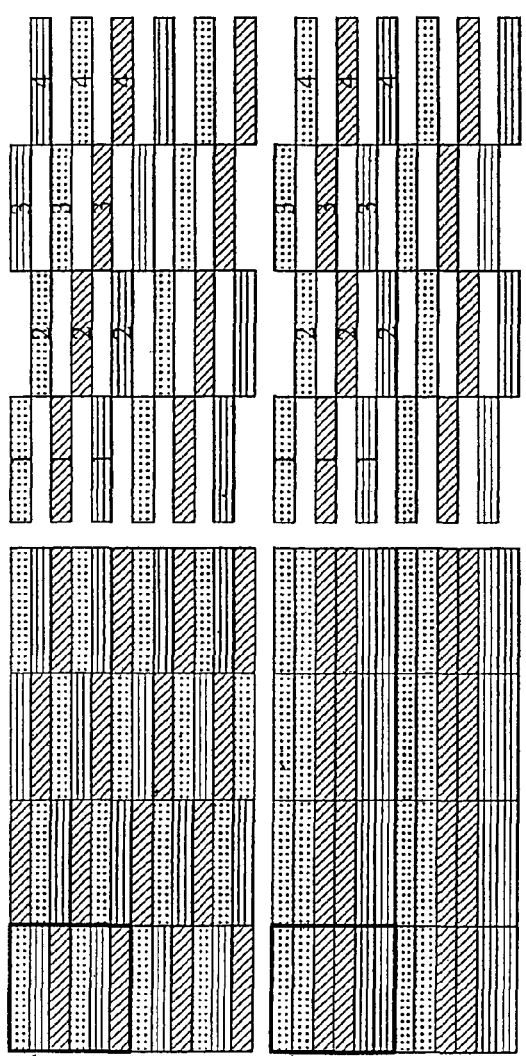
FIG 9(j) 6x
FIG 9(k) 6x
FIG 9(l) 6x

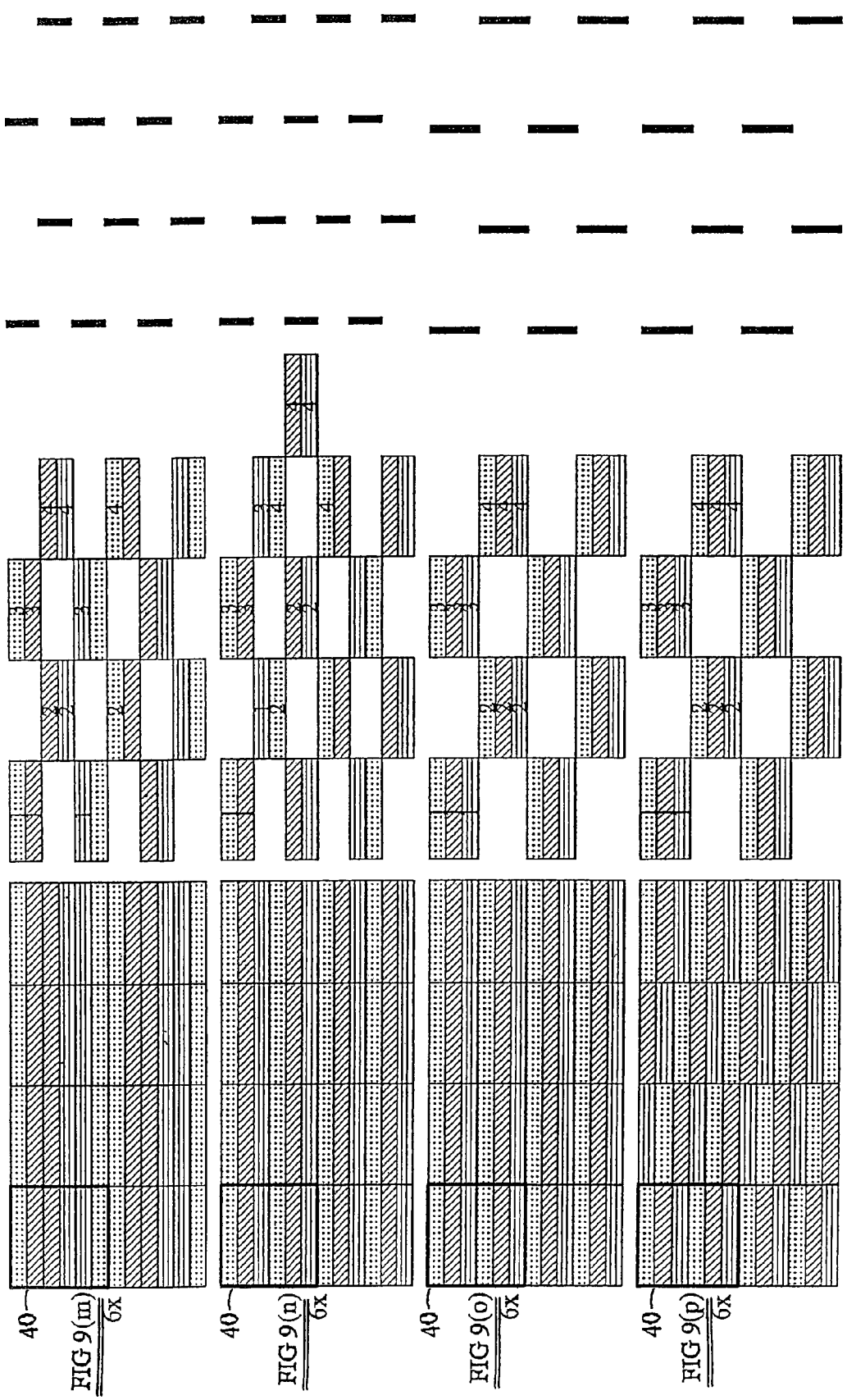

MULTIPLE VIEW DISPLAY

TECHNICAL FIELD

The present invention relates to two view displays. Such displays may be used in situations where two different people are required to see two different images on the same display screen. In such situations, the viewing angle between views is required to be relatively large, for example of the order of 60 degrees.

Such displays may also be used in three-dimensional (3D) displays such as autostereoscopic displays. Examples of applications of such displays include 3D mobile handsets, 3D games, 3D computer monitors, 3D laptop displays, 3D workstations and 3D professional imaging (for example for medical, design or architectural use). In some 3D display applications, it is necessary to increase the eye separation distance for a particular viewing distance or to decrease the viewing distance for a particular eye separation.

BACKGROUND

For many years now displays have been designed for multiple users and optimised so that viewers can see the same good image quality from different angles with respect to the display. This assumes that the multiple users require the same information from the display. However, there are many applications where it would be desirable for the individual users to be able to see different information from the same display. For example in an automobile, the driver may wish to view satellite navigation data while the passenger may wish to view a movie. If two displays were used in this instance, it would be possible for the driver to view the movie, which might be distracting, and providing two displays would take up extra space and increase cost. In computer games, each player may wish to view the game from his or her own perspective. This is currently done by each player viewing their unique perspective on individual screens. This takes up a lot of space and is not practical for portable games.

By showing more than one image to more than one user on one display, there can be a considerable saving in space and cost. This may be desirable in airplanes where each passenger is provided with their own video screen. By providing one central screen for two or more passengers but retaining the ability to select their own movie, there could be a considerable saving in cost, space and weight. There is also the ability to preclude the users from seeing each other's views. This might be a desirable thing in security applications such as banking or sales transactions as well as games.

In normal vision, the two human eyes perceive views of the world from different perspectives due to their separate location within the head. These two perspectives are then used by the brain to assess the distance to the various objects in a scene. In order to build a display which will effectively display a three dimensional image, it is necessary to re-create this situation and supply a so-called "stereoscopic pair" of images, one to each eye of the observer.

Three dimensional displays are classified into two types depending on the method used to supply the different views to the eyes;

Stereoscopic displays typically display both of the images over a wide viewing area However, each of the views is encoded, for instance by colour, polarisation state or time of display, so that a filter system of glasses worn by the observer can separate the views and will only let each eye see the view that is intended for it.

Autostereoscopic displays require no viewing aids to be worn by the observer. Instead, the two views are only visible from defined regions of space. The region of space in which an image is visible across the whole of the display active area is termed a "viewing region". If the observer is situated such that one of their eyes is in one viewing region and the other eye is in the viewing region for the other image of the pair, then a correct set of views will be seen and a three-dimensional image will be perceived.

For flat panel autostereoscopic displays, the formation of the viewing regions is typically due to a combination of the pixel structure of the display unit and an optical element, generically termed a parallax optic. An example of such an optic is a parallax barrier, which is a screen with vertical transmissive slits separated by opaque regions. This screen can be set in front of a spatial light modulator (SLM) with a two-dimensional array of pixel apertures as shown in FIG. 1 of the accompanying drawings. The pitch of the slits in the parallax barrier is chosen to be close to an integer multiple of the pixel pitch of the SLM so that groups of columns of pixels are associated with a specific slit of the parallax barrier. FIG. 1 shows an SLM in which two pixel columns are associated with each slit of the parallax barrier.

The display shown in FIG. 1 comprises an SLM in the form of a liquid crystal device (LCD) having an active matrix thin film transistor (TFT) substrate 1 and a counter-substrate 2, between which are disposed a liquid crystal layer forming a picture element (pixel) plane 3 with associated electrodes and alignment layers (not shown) as appropriate. Viewing angle enhancement films 4 and polarisers 5 are provided on the outer surfaces of the substrates 1 and 2 and illumination 6 is supplied from a backlight (not shown). A parallax barrier comprises a substrate 7 with a barrier aperture array 8 formed on its surface adjacent the LCD and an anti-reflection (AR) coating 9 formed on the other surface thereof.

The pixels of the LCD are arranged as rows and columns with the pixel pitch in the row or horizontal direction being p. The aperture array 8 comprises vertical transmissive slits with a slit width of 2 w and a horizontal pitch b. The plane of the barrier aperture array 8 is spaced from the pixel plane 3 by a distance s.

In use, the display forms left and right viewing windows 10 and 11 in a window plane at the desired viewing distance of a display. The window plane is spaced from the plane of the aperture array 8 by a distance $r_o$. The windows 10 and 11 are contiguous in the window plane and have a width and pitch e corresponding to the average human eye separation. The half angle to the centre of each window 10, 11 from the display normal is illustrated at $\alpha$.

FIG. 2 of the accompanying drawings shows the angular zones of light created from an SLM 20 and parallax barrier 21 where the parallax barrier has a pitch of an exact integer multiple of the pixel column pitch. In this case, the angular zones coming from different locations across the display panel surface intermix and a pure zone of view for image 1 or image 2 does not exist. In order to address this, the pitch of the parallax optic is reduced slightly so that the angular zones converge at a pre-defined plane (termed the "window plane") in front of the display. This change in the parallax optic pitch is termed "viewpoint correction" and the effect is illustrated in FIG. 3 of the accompanying drawings. The viewing regions, when created in this way, are roughly kite shaped in plan view.

For a colour display, each pixel is generally given a filter associated with one of the three primary colours. By controlling groups of three pixels each with a different colour filter, a large range of visible colours may be produced. In the autostereoscopic display, each of the stereoscopic image channels must contain sufficient of the colour filters for a balanced colour output. Many SLMs have the colour filters arranged in vertical columns, due to ease of manufacture, so that all the pixels in a given column have the same colour filter associated with them. If a parallax optic is disposed on such an SLM with three pixel columns associated with each slit or lenslet, then each viewing region will see pixels of one colour only. Care must be taken in the colour filter layout to avoid this situation and known examples of layouts are disclosed in EP 0752 609 and EP 0 770 889.

The function of the parallax optic is to restrict the light transmitted through the pixels to certain output angles. This restriction defines the angle of view of each of the pixel columns behind a given slit. The angular range of view of each pixel is decided by the refractive index of the glass, n, the pixel pitch, p, and the separation between the pixel and the parallax optic planes, s, in accordance with:

$$\sin\alpha = n\sin\left(\arctan\left(\frac{p}{2s}\right)\right)$$

In order to increase the angle between viewing windows, it is necessary to increase the pixel pitch, p, decrease the gap between the parallax optic and the pixels, s, or increase the refractive index of the glass, n. Changing any of these variables is not easy. It is not always practical or cost-effective to significantly change the refractive index of the substrate glass. Pixel pitch is typically defined by the required resolution specification of the panel and therefore cannot be changed. Additionally, increasing pixel pitch requires a similar increase in the parallax barrier pitch which makes the barrier more visible, thus detracting from the final image quality. Decreasing s results in manufacturing problems associated with making and handling thin glass. Therefore, it is difficult to use a standard parallax barrier to create 3D or multi-view displays with wide viewing angles.

FIG. 4 of the accompanying drawings illustrates another known type of directional display in the form of a rear parallax barrier display. In the front parallax barrier display shown in FIG. 1, the parallax barrier is disposed between the SLM and the viewing windows 10 and 11 whereas, in the rear parallax barrier display shown in FIG. 4, the SLM is disposed between the parallax barrier and the viewing windows 10 and 11.

U.S. Pat. No. 6,424,323 discloses an image deflection system in the form of a lenticular screen which overlies a display device. The display is controlled so as to provide at least two independent images for viewing from different viewing positions. The images are interlaced in vertical rows.

SUMMARY

According to the invention, there is provided a two view display comprising: a display device comprising first pixels and second pixels arranged as rows and columns with the first pixels alternating with the second pixels in the rows and in the columns; a parallax optic comprising rows and columns of parallax elements with each parallax element cooperating with at least one of the first pixels and at least one of the second pixels in the same row as and next to the at least one of the first pixels so as to direct light from the first and second pixels to the first and second viewing windows, respectively, each row of parallax elements being offset in the row direction with respect to each adjacent row by half the pitch in the row direction of the parallax elements; and a controller for supplying image data for first and second views to the first and second pixels, respectively.

The parallax optic may comprise a parallax barrier and the parallax elements may comprise slits.

The display device may comprise a spatial light modulator. The modulator may be a light-attenuating modulator. The modulator may be a liquid crystal device.

The parallax optic may be disposed between display device and the viewing regions and the pitch in the row direction of the parallax elements may be sufficiently less than twice the pitch in the row direction of the pixels to provided viewpoint correction. As an alternative, the display device may be disposed between parallax optic and the viewing regions and the pitch in the row direction of the parallax elements may be sufficiently greater than twice the pitch in the row direction of the pixels to provide viewpoint correction.

The pixels may be arranged as sets of red, green and blue pixels forming composite colour pixels.

The first and second views may comprise images which are unrelated to each other. As an alternative, the first and second views may comprise a stereoscopic pair.

It is thus possible to provide a two view display in which visibility of the parallax optic may be reduced and good image resolution may be achieved. In some embodiments, wider viewing windows and wider angles between views may be obtained. Such a display may be used to allow observers to see different and unrelated images from different viewing regions of the display. Such a display is also suitable for use as an autostereoscopic 3D display to provide wider viewing window spacing and/or closer viewing distances.

BRIEF DESCRIPTION OF THE DRAWINGS

FIG. 8 comprises FIGS. 8a-8d and illustrates four arrangements of display pixels and parallax elements constituting embodiments of the invention; and FIG. 9 comprises FIGS. 9a to 9p and illustrates sixteen arrangements of display pixels and parallax elements constituting further embodiments of the invention.

Like reference numerals refer to like parts throughout the drawings.

DETAILED DESCRIPTION

Figure 5:
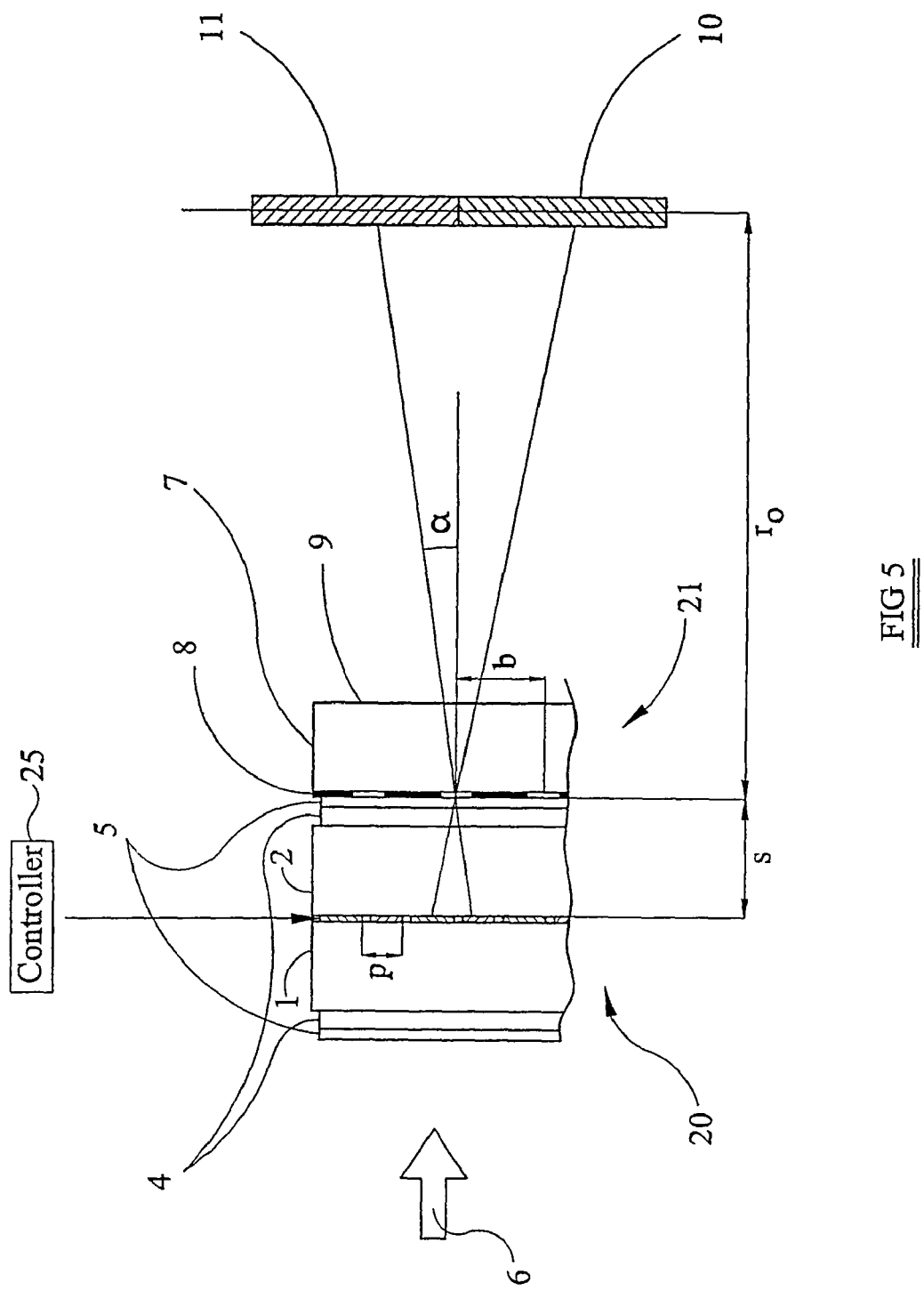
FIG. 5 is a diagrammatic plan view of a two view display constituting an embodiment of the invention.

The display shown in FIG. 5 is suitable for use as a two-view 3D autostereoscopic display, in which case a stereoscopic pair of images is displayed, or for allowing two unrelated images to be viewed from different viewing directions. The display is of the front parallax barrier type and differs from that illustrated in FIG. 1 in the structure of the parallax barrier 21 and in the way in which the pixels are allocated to the two images by a controller 25. For each row of pixels, the pitch b of the barrier slits is greater and the pitch p of the pixels is greater than illustrated in FIG. 1 so that wider viewing windows 10 and 11 are created with a larger half angle CL. The controller 25 may generate the image data to be displayed or may process image data from another source, such as a computer, such that the two views are displayed by the appropriate pixels of the SLM 20.

Figure 1:
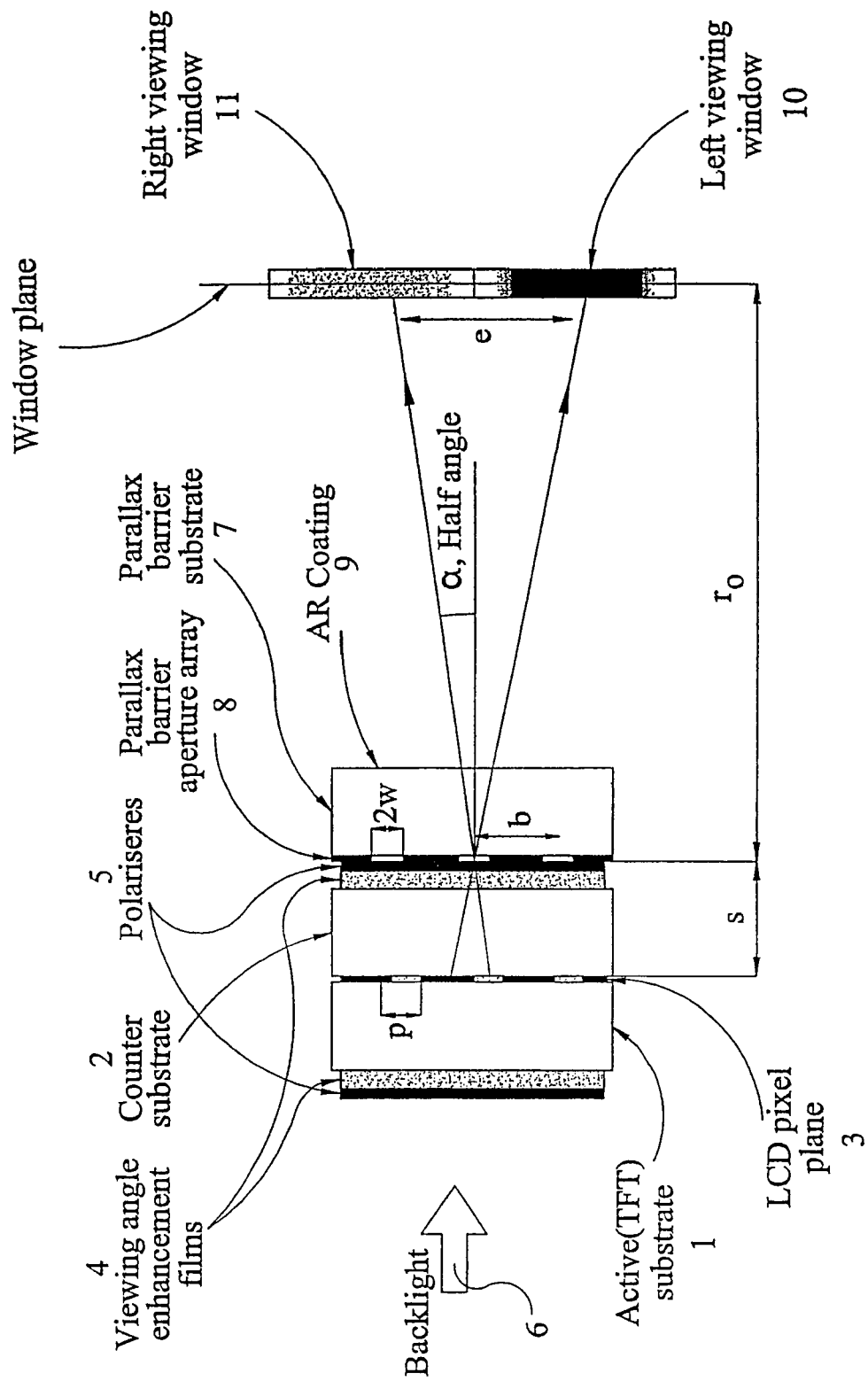
FIG. 1 is a diagrammatic plan view of an autostereoscopic 3D display of the known front parallax barrier type.
Figure 2:
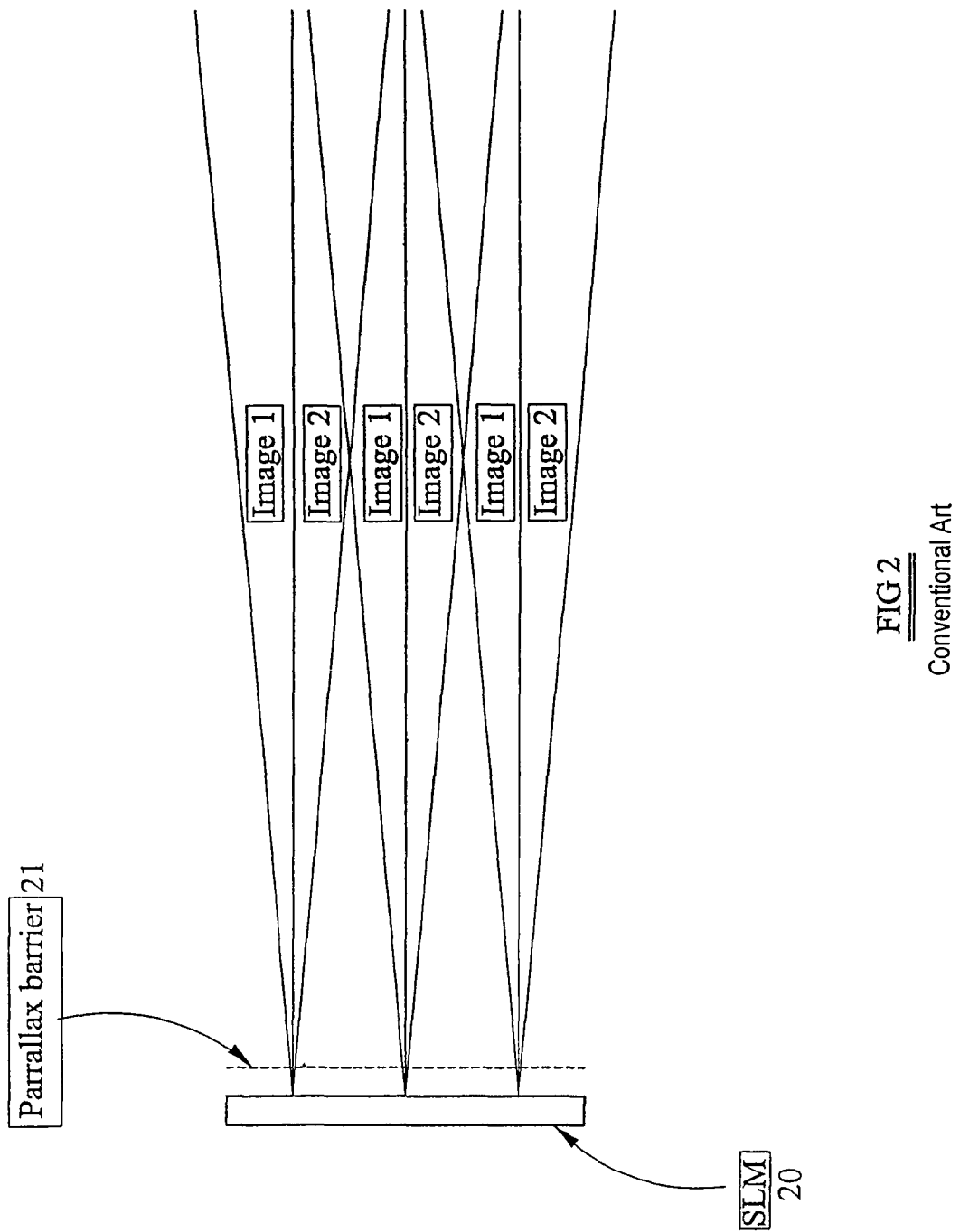
FIG. 2 is a plan view illustrating the formation of viewing regions in a display of the type shown in FIG. 1 without viewpoint correction.
Figure 3:
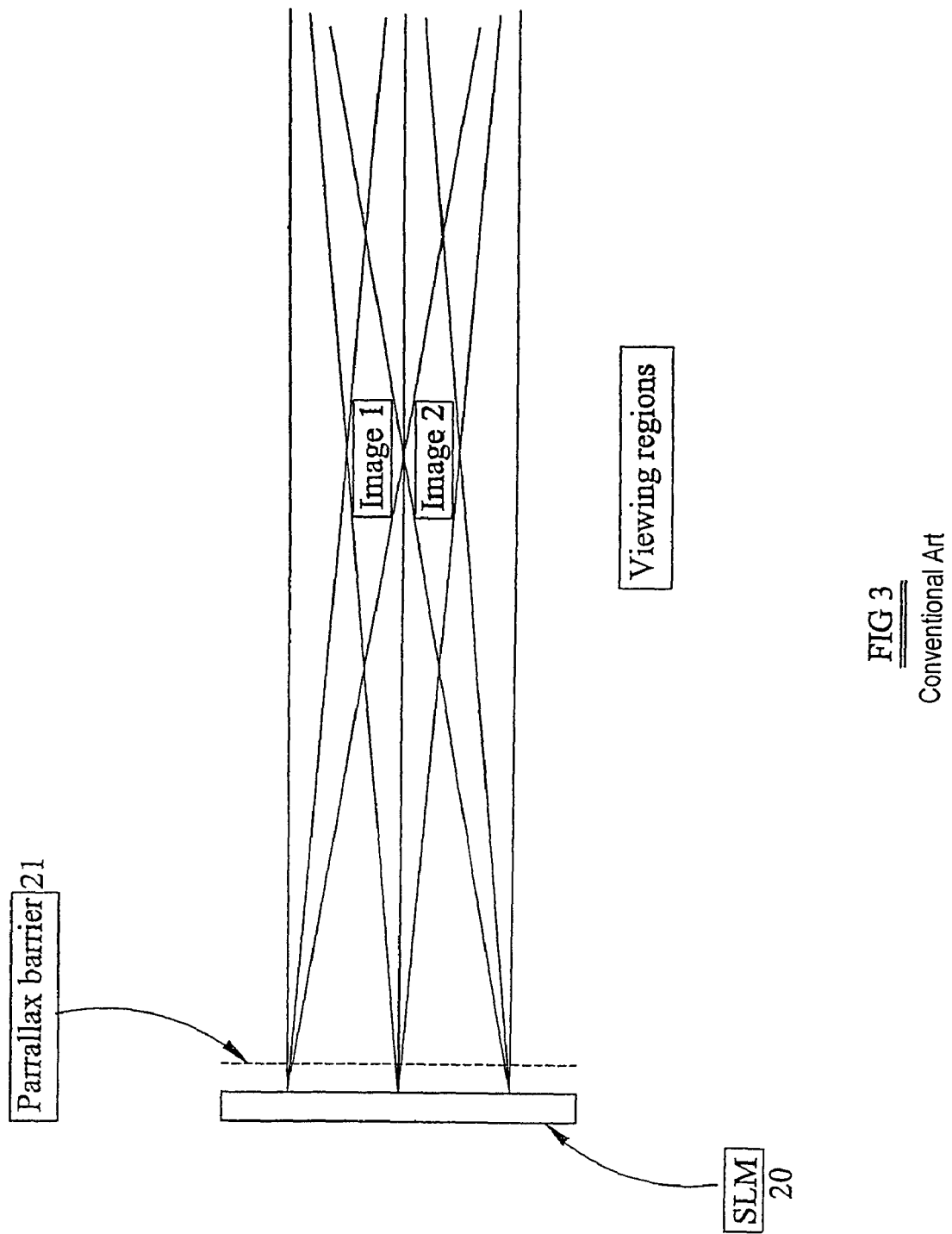
FIG. 3 is a plan view illustrating the creation of viewing regions for a display of the type shown in FIG. 1 with viewpoint correction.
Figure 6:
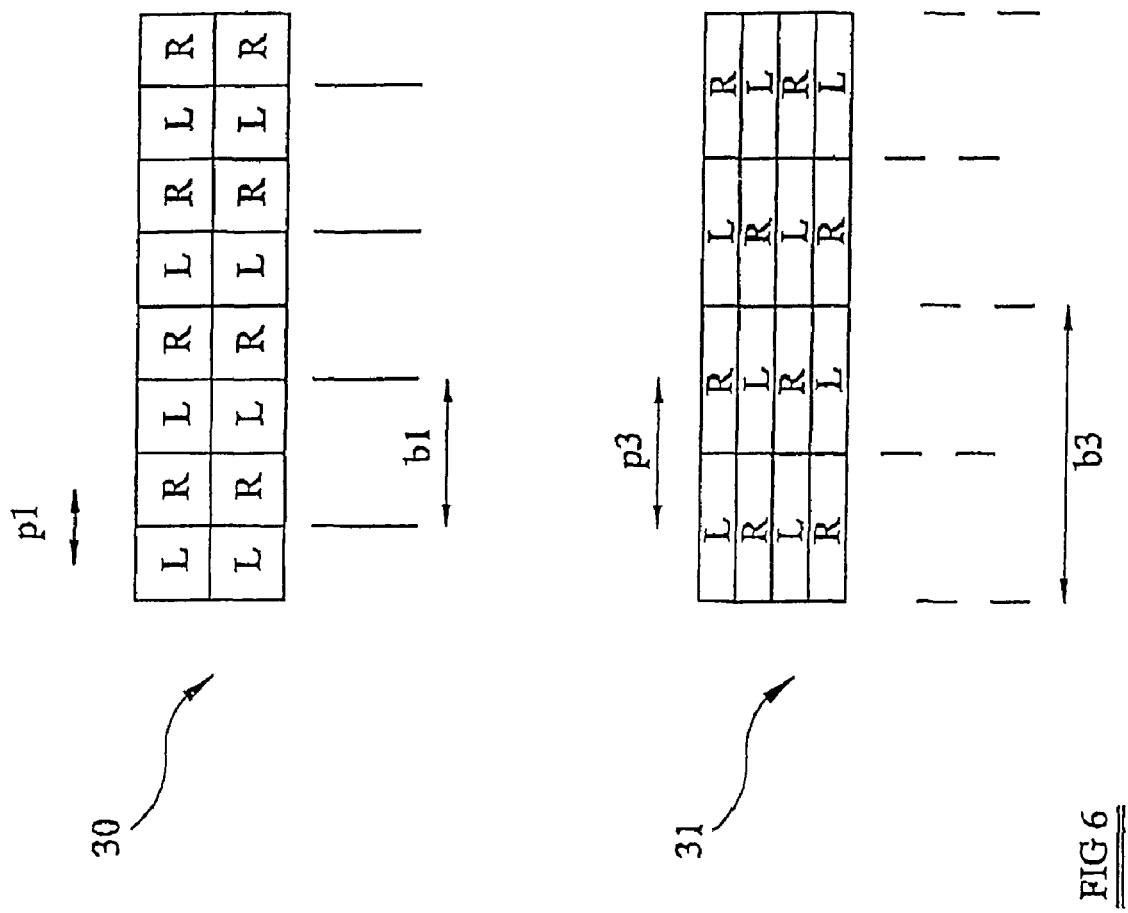
FIG. 6 is a diagram comparing a known arrangement of display pixels and parallax elements with an arrangement which may be used in the display of FIG. 5.

FIG. 6 illustrates at 30 the arrangement of pixels and barrier slits in a conventional display of the type shown in FIG. 1. In this case, a monochrome image is being displayed with pixels displaying left eye image data indicated by L and pixels displaying right eye image data indicated by R. Each column of pixels displays a slice of one of the views and adjacent pairs of columns cooperate with a respective slit to define the viewing windows shown in FIG. 1. The pixels have a horizontal pitch p1 and the barrier slits have a horizontal pitch b1.

FIG. 6 illustrates at 31 the pixels and slit arrangements of the display of FIG. 5. Each pixel has twice the horizontal width and half the vertical height of the pixels shown at 30. Whereas the barrier slits illustrated at 30 comprise continuous parallel slits extending throughout the height of the barrier, the slits of the barrier shown at 31 comprise rows and columns of individual slits, each of which is substantially the same vertical height as the pixels. In each row, the slits have a horizontal pitch b3 twice that of the barrier illustrated at 30 and the pixels have a pitch p3 twice that of the pixels illustrated at 30. Each row of barrier slits at 31 is off-set horizontally i.e. in the row direction, with respect to each adjacent row of slits by half the pitch of the barrier slits in each row.

Each slit co-operates with a pair of left and right image pixels in adjacent columns and in the same row so as to generate the viewing windows 10 and 11 shown in FIG. 5. The controller 25 supplies image data to the pixels such that the left and right image pixels alternate in the row direction in each row and in the column direction in each column as illustrated at 31. The half angle α for the display illustrated in FIG. 5 and at 31 in FIG. 6 is twice that for the display illustrated in FIG. 1 and at 30 in FIG. 6. The horizontal and vertical resolutions of both displays are the same. With the pixel and barrier slit arrangement shown at 30, the vertical slices of each view are separated by continuous vertical slices for the other view. With the arrangement illustrated at 31, this is not the case as the pixels for each view are distributed across the rows and columns of pixels. Although the barrier slit pitch b3 at 31 is twice that at 30 and might therefore be more visible, this is at least partly off-set by the actual pattern of the individual slits such that any theoretical increase in visibility of the barrier structure is not, in practice, a problem. Thus, as compared with the known arrangement, for a given horizontal and vertical resolution specification, it is possible to double the angle between the viewing regions.

Figure 4:
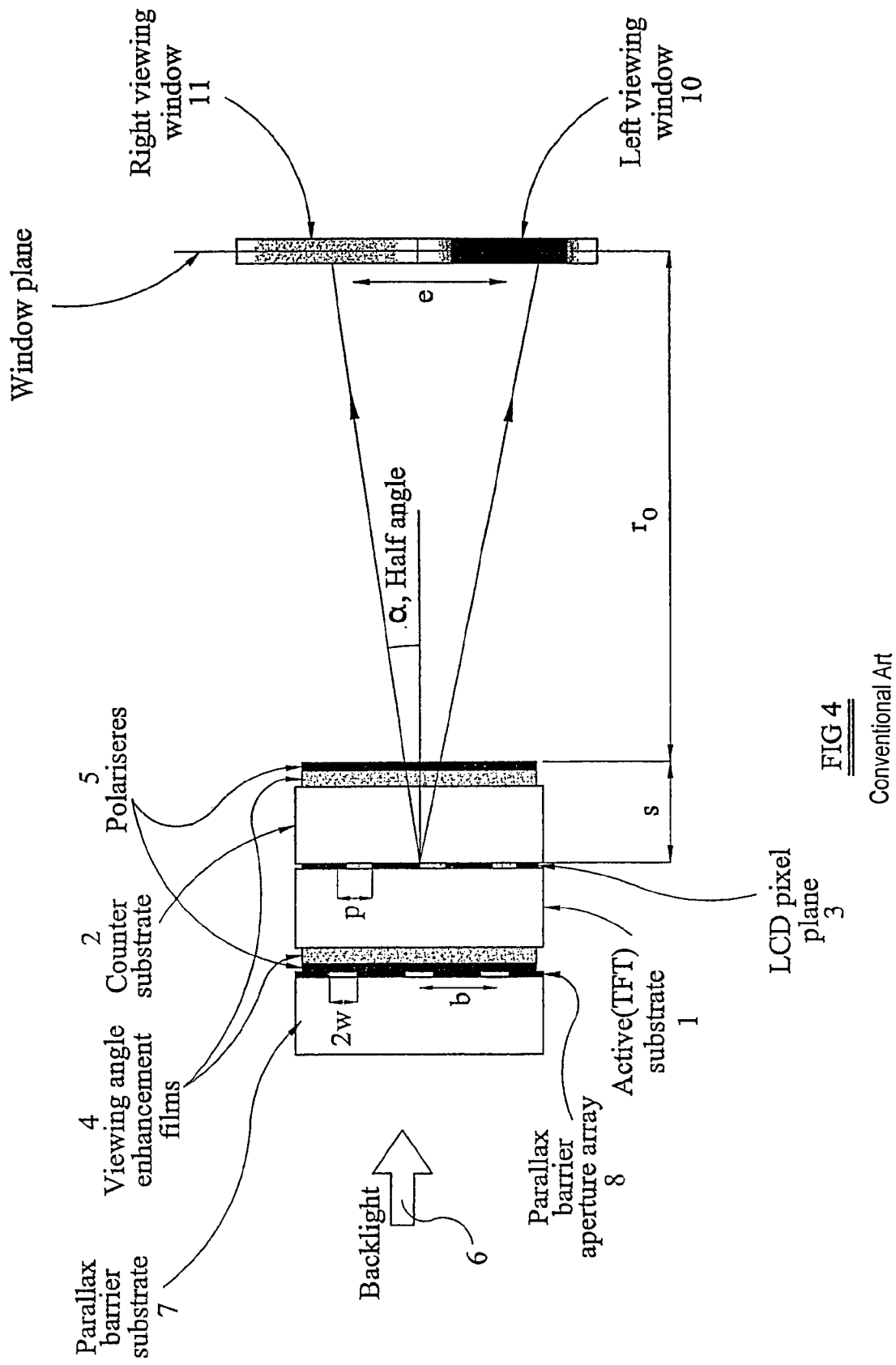
FIG. 4 is a diagrammatic plan view of a known type of rear parallax barrier autostereoscopic 3D display.

Although FIG. 5 illustrates a front parallax barrier multiple view display, the same principles can be applied to a rear parallax barrier, for example of the type illustrated in FIG. 4. In order to provide viewpoint correction in two-view displays, the parallax barrier slit pitch b is not exactly twice the horizontal pixel pitch p. In the case of a front barrier display, the slit pitch is slightly less than twice the pixel horizontal pitch whereas, in a rear barrier display, the slit pitch is slightly greater than twice the pixel horizontal pitch. Also, although parallax optics in the form of parallax barriers are illustrated in the drawings, alternative parallax optics, such as lenticular screens, may be used. Each parallax element is a slit when the optic is a barrier and a lenticule when the parallax optic is a lenticular screen. Also, although the SLM 20 is illustrated as being of the light-attenuating type, for example in the form of a liquid crystal device, light-emitting modulators may also be used but are limited to arrangements of the front parallax optic type.

Figures 7A, 7B:
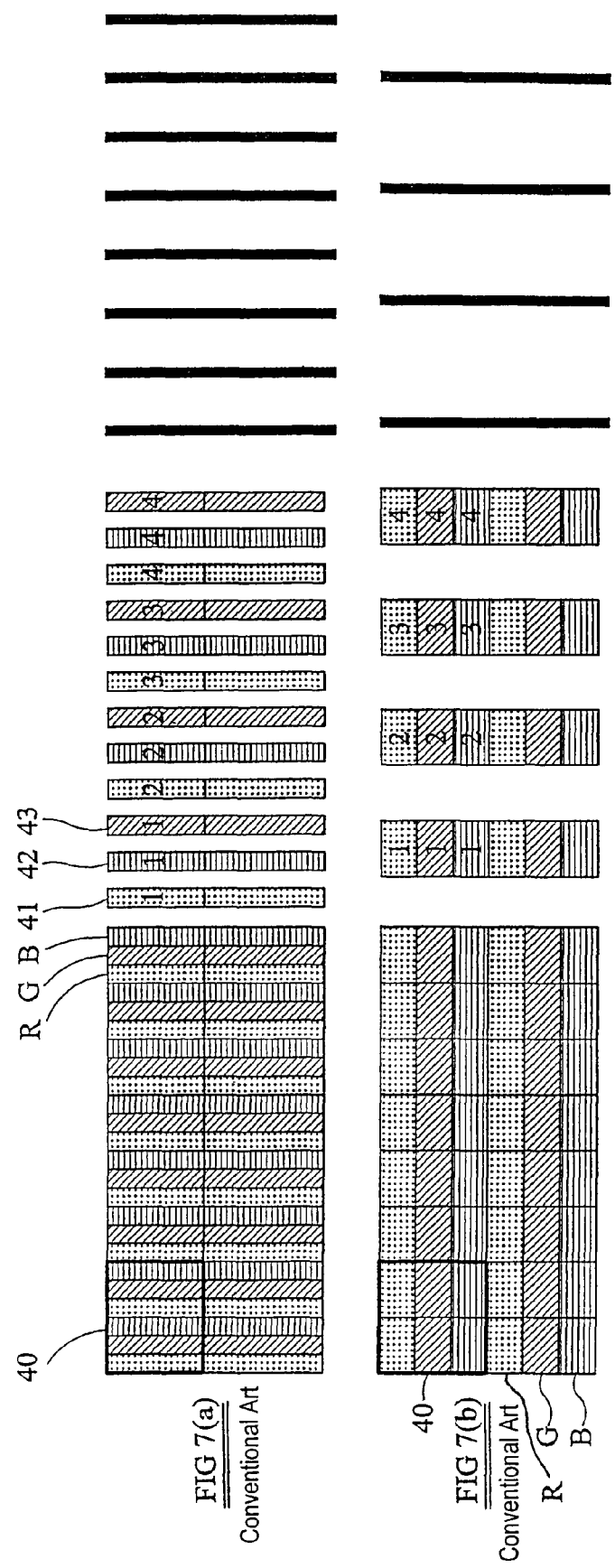
FIG. 7 comprises FIGS. 7a and 7b and illustrates two further known arrangements of display pixels and parallax elements.

FIG. 7 illustrates known arrangements of display pixels and barrier slits for displaying colour images. In FIG. 7a, each column of pixels represents a single respective colour and a colour filter having a repeating sequence of red (R), green (G) and blue (B) vertical strips is provided. Each strip has the width of a single pixel column.

In FIG. 7b, the colour filter strips extend horizontally so that the pixels of each row display a single respective colour.

The black rectangle frames 40 in FIG. 7 and in the following Figures illustrate a region of each display panel of the same shape and size and having an area sufficient for six individual pixels making up two composite colour or "white" pixels. These frames allow direct comparisons of the divisions into sub-pixels. Thus, in FIG. 7a, each pair of white pixels is divided into six portions in the horizontal direction in the frame 40. In FIG. 7b, each white pixel is divided into two portions in the horizontal direction and into three portions in the vertical direction.

The middle columns in FIG. 7 and the subsequent drawings illustrate the pixel arrangement visible in one view. The numbers within the pixels refer to composite or white pixels so that the individual sub-pixels for white pixel 1 of view 1 are shown, for example, at 41 to 43 in FIG. 7a. The right hand column in FIG. 7 and the subsequent drawings illustrates the parallax barrier slit structure used with the sub-pixel and colour filter arrangement illustrated in the left hand column.

FIG. 8 demonstrates arrangements applied to standard panels. By applying a split rows barrier to standard panels, the separation angle does not increase but the visibility of the barrier and the pixel arrangement decreases.

In FIG. 8a, each white pixel is divided into six portions in the horizontal direction. The colour filters are arranged in vertical stripes. This gives the same separation angle as FIG. 7a. The barrier alternates phase every row. The pixel arrangement seen in one view window is shown. An example of how the data could be arranged is shown. There are no vertical stripes without pixel data as in FIG. 7a. The horizontal and vertical resolutions are the same as in FIG. 7. The broken up nature of the barrier and pixel arrangement is less visible than in FIG. 7.

In FIG. 8b, each white pixel is divided into two portions in the horizontal and into three portions in the vertical direction. The colour filters are arranged in horizontal stripes. This gives the same separation angle as FIG. 7b. The barrier alternates phase every three rows. The pixel arrangement seen in one view window is shown. An example of how the data could be arranged is shown. There are no vertical stripes without pixel data as in FIG. 7b. The horizontal and vertical resolutions are the same as in FIG. 7. The broken up nature of the barrier and pixel arrangement is less visible than in FIG. 7.

In FIG. 8c, each white pixel is divided into two portions in the horizontal and into three portions in the vertical direction. The colour filters are arranged in horizontal stripes. This gives the same separation angle as FIG. 7b. The barrier alternates phase every two rows. The pixel arrangement seen in one view window is shown. An example of how the data could be arranged is shown. There are no vertical stripes without pixel data as in FIG. 7b. The horizontal and vertical resolutions are the same as in FIG. 7. The broken up nature of the barrier and pixel arrangement is less visible than in FIG. 7.

In FIG. 8d, each white pixel is divided into two portions in the horizontal and into three portions in the vertical direction. The colour filters are arranged in horizontal stripes. This gives the same separation angle as FIG. 7b. The barrier alternates phase every row. The pixel arrangement seen in one view window is shown. An example of how the data could be arranged is shown. There are no vertical stripes without pixel data as in FIG. 7b. The horizontal and vertical resolutions are the same as in FIG. 7. The broken up nature of the barrier and pixel arrangement is less visible than in FIG. 7.

FIG. 9 demonstrates several possible arrangements applied to custom pixel designed panels.

In FIG. 9a, each white pixel is divided into three portions in the horizontal direction and into two portions in the vertical direction. This results in a 2× increase in horizontal pitch and a corresponding increase in window separation angle over FIG. 7a. The colour filters are arranged in vertical stripes. The barrier alternates phase every row. The pixel arrangement seen in one view window is shown. An example of how the data could be arranged is shown. There is no overlap of colour subpixels between neighbouring white pixels. The horizontal and vertical resolutions are the same as in FIG. 7. The broken up nature of the barrier and pixel arrangement are less visible than in FIG. 7.

In FIG. 9b, each white pixel is divided into two portions in the horizontal and into three portions in the vertical direction. This results in a 3× increase in horizontal pitch and corresponding increase in window separation angle over FIG. 7a. The colour filters are arranged in vertical stripes. The barrier alternates phase every row. The pixel arrangement seen in one view window is shown. An example of how the data could be arranged is shown. There is some overlap of colour subpixels between neighbouring white pixels. The horizontal and vertical resolutions are the same as in FIG. 7. The broken up nature of the barrier and pixel arrangement is less visible than in FIG. 7. In FIG. 9c, each white pixel is divided into two portions in the horizontal and into three portions in the vertical direction. This results in a 3× increase in horizontal pitch and corresponding increase in window separation angle over FIG. 7a. The colour filters are arranged in diagonal stripes. The barrier alternates phase every row. The pixel arrangement seen in one view window is shown. An example of how the data could be arranged is shown. The colour subpixels that overlap between neighbouring white pixels are of a different colour whereas they were the same colour in FIG. 9b. The horizontal and vertical resolutions are the same as in FIG. 7. The broken up nature of the barrier and pixel arrangement is less visible than in FIG. 7.

In FIG. 9d, each white pixel is divided into two portions in the horizontal and into three portions in the vertical direction. This results in a 3× increase in horizontal pitch and corresponding increase in window separation angle over FIG. 7a. The colour filters are arranged in a special pattern. The barrier alternates phase every row. The pixel arrangement seen in one view window is shown. An example of how the data could be arranged is shown. The colour subpixels do not overlap between neighbouring white pixels. The horizontal and vertical resolutions are the same as in FIG. 7. The broken up nature of the barrier and pixel arrangement is less visible than in FIG. 7.

In FIG. 9e, each white pixel is divided into two portions in the horizontal and into three portions in the vertical direction. This results in a 3× increase in horizontal pitch and corresponding increase in window separation angle over FIG. 7a. The colour filters are arranged in diagonal stripes. The barrier alternates phase every three rows. The pixel arrangement seen in one view window is shown. An example of how the data could be arranged is shown. The colour subpixels do not overlap between neighbouring white pixels. There are no vertical stripes without pixel data as in FIG. 7b. The horizontal and vertical resolutions are the same as in FIG. 7. The broken up nature of the barrier and pixel arrangement is less visible than in FIG. 7. The finite vertical slit width could cause some unbalanced colour mixing due to the sampling frequency of the vertical slits equalling the frequency of the colour filters. This is compensated in neighbouring columns by the phase shift of the colour filters relative to the vertical slits.

In FIG. 9f, each white pixel is divided into 1.5 portions in the horizontal and into four portions in the vertical direction. This results in a 4× increase in horizontal pitch and corresponding increase in window separation angle over FIG. 7a. The colour filters are arranged in vertical stripes. The barrier alternates phase every row. The pixel arrangement seen in one view window is shown. An example of how the data could be arranged is shown. There is overlap of two colour subpixels between neighbouring white pixels. The horizontal and vertical resolutions are the same as in FIG. 7. The broken up nature of the barrier and pixel arrangement is less visible than in FIG. 7.

In FIG. 9g, each white pixel is divided into 1.5 portions in the horizontal and into four portions in the vertical direction. This results in a 4× increase in horizontal pitch and corresponding increase in window separation angle over FIG. 7a. The colour filters are arranged in horizontal stripes. The barrier alternates phase every two rows. The pixel arrangement seen in one view window is shown. An example of how the data could be arranged is shown. There is overlap of one colour subpixel between neighbouring white pixels. The horizontal and vertical resolutions are the same as in FIG. 7. The broken up nature of the barrier and pixel arrangement is less visible than in FIG. 7.

In FIG. 9h, each white pixel is divided into 1.5 portions in the horizontal and into four portions in the vertical direction. This results in a 4× increase in horizontal pitch and corresponding increase in window separation angle over FIG. 7a. The colour filters are arranged in horizontal stripes. The barrier alternates phase every three rows. The pixel arrangement seen in one view window is shown. An example of how the data could be arranged is shown. There is no overlap of the colour subpixels between neighbouring white pixels. The horizontal and vertical resolutions are the same as in FIG. 7. The broken up nature of the barrier and pixel arrangement is less visible than in FIG. 7.

In FIG. 9i, each white pixel is divided into 1.5 portions in the horizontal and into four portions in the vertical direction. This results in a 4× increase in horizontal pitch and corresponding increase in window separation angle over FIG. 7a. The colour filters are arranged in horizontal stripes. The barrier alternates phase every four rows. The pixel arrangement seen in one view window is shown. An example of how the data could be arranged is shown. There is some overlap of one colour subpixel between neighbouring white pixels. The horizontal and vertical resolutions are the same as in FIG. 7. The broken up nature of the barrier and pixel arrangement is less visible than in FIG. 7.

In FIG. 9j, each white pixel is divided so as to have one portion in the horizontal and six portions in the vertical direction. This results in a 6× increase in horizontal pitch and corresponding increase in window separation angle over FIG. 7a. The colour filters are arranged in vertical stripes. The barrier alternates phase every row. The pixel arrangement seen in one view window is shown. An example of how the data could be arranged is shown. There is overlap of two colour subpixels between neighbouring white pixels and overlap of one colour subpixel between alternating white pixels. The horizontal and vertical resolutions are the same as in FIG. 7. The broken up nature of the barrier and pixel arrangement is less visible than in FIG. 7.

In FIG. 9k, each white pixel is divided so as to have one portion in the horizontal and six portions in the vertical direction. This results in a 6× increase in horizontal pitch and corresponding increase in window separation angle over FIG. 7a. The colour filters are arranged in diagonal stripes. The barrier alternates phase every row. The pixel arrangement seen in one view window is shown. An example of how the data could be arranged is shown. There is no overlap of the colour subpixels between neighbouring white pixels. The horizontal and vertical resolutions are the same as in FIG. 7. The broken up nature of the barrier and pixel arrangement is less visible than in FIG. 7.

In FIG. 9l each white pixel is divided so as to have one portion in the horizontal and six portions in the vertical direction. This results in a 6× increase in horizontal pitch and corresponding increase in window separation angle over FIG. 7a. The colour filters are arranged in horizontal stripes changing colour every two rows. The barrier alternates phase every row. The pixel arrangement seen in one view window is shown. An example of how the data could be arranged is shown. There is no overlap of the colour subpixels between neighbouring white pixels. The horizontal and vertical resolutions are the same as in FIG. 7. The broken up nature of the barrier and pixel arrangement is less visible than in FIG. 7.

In FIG. 9m, each white pixel is divided so as to have one portion in the horizontal and six portions in the vertical direction. This results in a 6× increase in horizontal pitch and corresponding increase in window separation angle over FIG. 7a. The colour filters are arranged in horizontal stripes changing colour every two rows. The barrier alternates phase every two rows. The pixel arrangement seen in one view window is shown. An example of how the data could be arranged is shown. There is no overlap of the colour subpixels between neighbouring white pixels. The horizontal and vertical resolutions are the same as in FIG. 7. The broken up nature of the barrier and pixel arrangement is less visible than in FIG. 7.

In FIG. 9n, each white pixel is divided so as to have one portion in the horizontal and six portions in the vertical direction. This results in a 6× increase in horizontal pitch and corresponding increase in window separation angle over FIG. 7a. The colour filters are arranged in horizontal stripes. The barrier alternates phase every two rows. The pixel arrangement seen in one view window is shown. An example of how the data could be arranged is shown. There is overlap of one and sometimes two colour subpixels between neighbouring white pixels. The horizontal and vertical resolutions are the same as in FIG. 7. The broken up nature of the barrier and pixel arrangement is less visible than in FIG. 7.

In FIG. 9o, each white pixel is divided so as to have one portion in the horizontal and six portions in the vertical direction. This results in a 6× increase in horizontal pitch and corresponding increase in window separation angle over FIG. 7a. The colour filters are arranged in horizontal stripes. The barrier alternates phase every three rows. The pixel arrangement seen in one view window is shown. An example of how the data could be arranged is shown. The finite vertical slit width could cause some unbalanced colour mixing due to the sampling frequency of the vertical slits equalling the frequency of the colour filters. There is no overlap of the colour subpixels between neighbouring white pixels. The horizontal and vertical resolutions are the same as in FIG. 7. The broken up nature of the barrier and pixel arrangement is less visible than in FIG. 7.

In FIG. 9p, each white pixel is divided so as to have one portion in the horizontal and six portions in the vertical direction. This results in a 6× increase in horizontal pitch and corresponding increase in window separation angle over FIG. 7a. The colour filters are arranged in diagonal stripes. The barrier alternates phase every three rows. The pixel arrangement seen in one view window is shown. An example of how the data could be arranged is shown. The finite vertical slit width could cause some unbalanced colour mixing due to the sampling frequency of the vertical slits equalling the frequency of the colour filters. This is compensated in neighbouring columns by the phase shift of the colour filters relative to the vertical slits. There is no overlap of the colour subpixels between neighbouring white pixels. The horizontal and vertical resolutions are the same as in FIG. 7. The broken up nature of the barrier and pixel arrangement is less visible than in FIG. 7.

What is claimed is:

1. A two view display for displaying in respective display areas first and second images corresponding to respective views, the display areas being first and second display areas arranged in a horizontal direction and defined as first and second views, comprising:
    a display device comprising first pixels and second pixels arranged as rows and columns with said first pixels alternating with said second pixels in said rows and in said columns;
    a parallax optic comprising rows and columns of parallax elements, said parallax elements being positioned in relation to at least one of said first pixels and at least one of said second pixels in a same row as and next to said at least one of said first pixels such that light from said first pixels is directed to said first display area by said parallax element and light from said second pixels is directed to said second display area by said parallax element, and an arrangement of said parallax element in said each row being shifted to said parallax element in a next row by half the pitch of said parallax element in a row direction, wherein the parallax elements include a slit pitch to provide viewpoint correction, the slit pitch being selected such that when said parallax optic is disposed between said display device and said viewing regions the slit pitch is sufficiently less than twice a pitch in said row direction of said pixels and when said display device is disposed between said parallax optic and said viewing regions the slit pitch is sufficiently greater than twice a pitch in said row direction of said pixels; and
    a controller for supplying image data for first and second views to said first and second pixels, respectively,
    wherein a size of a row direction of said pixels is defined to be larger than a size of a column direction of said pixels so as to increase an angle, which is defined by the size and formed by a first view direction to said display device and a second view direction to said display device.

2. A display as claimed in claim 1, in which said parallax optic comprises a parallax barrier defining a plurality of slits constituting said parallax elements.

3. A display as claimed in claim 1, in which said display device comprises a spatial light modulator.

4. A display as claimed in claim 3, in which said modulator is a light-attenuating modulator.

5. A display as claimed in claim 4, in which said modulator is a liquid crystal device.

6. A display as claimed in claim 1, in which said pixels are arranged as sets of red, green and blue pixels forming composite colour pixels.

7. A display as claimed claim 1, in which said first and second views comprise images which are unrelated to each other.

8. A display as claimed in claim 1, in which said first and second views comprise a stereoscopic pair.

* * * * *